United States Patent [19]

Sarfati et al.

[11] Patent Number: 5,003,165
[45] Date of Patent: Mar. 26, 1991

[54] METHOD AND AN APPARATUS FOR SELECTING THE BEST FOCAL POSITION FROM A PLURALITY OF FOCAL POSITIONS

[75] Inventors: Steven M. Sarfati, Woodland Hills; Harvey L. Kasdan, Van Nuys, both of Calif.

[73] Assignee: International Remote Imaging Systems, Inc., Chatsworth, Calif.

[21] Appl. No.: 357,329

[22] Filed: May 25, 1989

[51] Int. Cl.$^5$ ............................ G01J 1/20; G03B 3/10
[52] U.S. Cl. .............................. 250/201.2; 250/201.7; 354/404
[58] Field of Search ......................... 250/201.2, 201.7; 354/402, 404, 409

[56] References Cited
U.S. PATENT DOCUMENTS 4,329,577 5/1982 Asano et al. ..................... 250/201.2

Primary Examiner—Edward P. Westin
Attorney, Agent, or Firm—Limbach, Limbach & Sutton

[57] ABSTRACT

A passive method for selecting the best focal position from a plurality of focal positions for a lens focussing on an image in a field of view is disclosed. The lens forms an image at a first position. The image is segmented to form a plurality of pixels. A histogram of the intensity of light at each of the pixels in the image is determined. A cumulative histogram is developed therefrom. A sharpness value is determined from the cumulative histogram. The sharpness value is the intensity of light that corresponds to the smallest cumulative pixel number having a non-zero intensity of light value. The lens is then moved to a new position and another sharpness for the new position is determined. From the plurality of positions moved by the lens, the smallest or lowest sharpness value is chosen and the position that corresponds to that smallest or lowest sharpness value is the position that represents the best focal position.

23 Claims, 3 Drawing Sheets

METHOD AND AN APPARATUS FOR SELECTING THE BEST FOCAL POSITION FROM A PLURALITY OF FOCAL POSITIONS

TECHNICAL FIELD

The present invention relates to a method and an apparatus for bringing a focussing means, such as a lens, into a focal position which is the best focal position, selected from a plurality of focal positions. More particularly, the present invention relates to such a method and an apparatus, wherein the determination of the best focal position is made by a passive apparatus.

BACKGROUND OF THE INVENTION

Methods and apparatuses for automatically bringing a lens into a focussing position with respect to an image in a field of view are well-known in the art. In the prior art, such methods and apparatuses have employed sonar or infrared transmission and reception to determine the distance of the lens to the image and determining the best focal position therefrom. All of these techniques are termed active distance determination techniques. The disadvantage of an active distance determination technique is that energy must be expended in generating the sonar or the infrared signal. In consumer electronics or in portable cameras, the use of an active distance determination technique shortens the battery life. Further, the techniques necessarily include circuitry for both transmission and detection of the medium.

SUMMARY OF THE INVENTION

In the present invention a method of selecting the best focal position from a plurality of focal positions for a lens focussing an image in a field of view is disclosed. The lens is moved to a first position. An image is formed at the first position. The image is segmented to form a plurality of pixels. A histogram of the intensity of light of each pixel in the image is formed. A cumulative histogram of the intensity of light of each pixel in the image is then formed. The intensity of light that corresponds to the smallest, cumulative pixel number having a non-zero intensity of light value from the cumulative histogram is recorded (hereinafter: "sharpness value"). The lens is then moved to a new position and the steps of forming an image, segmenting an image, forming a histogram, forming a cumulative histogram, and recording the sharpness value are repeated. For each of the plurality of focal positions, the steps are repeated, and the sharpness value is recorded. The focal position that results in the smallest sharpness value is chosen, wherein that focal position represents the best focal position.

The present invention also contemplates an apparatus to carry out the foregoing method.

DETAILED DESCRIPTION OF THE DRAWINGS

Figure 1:
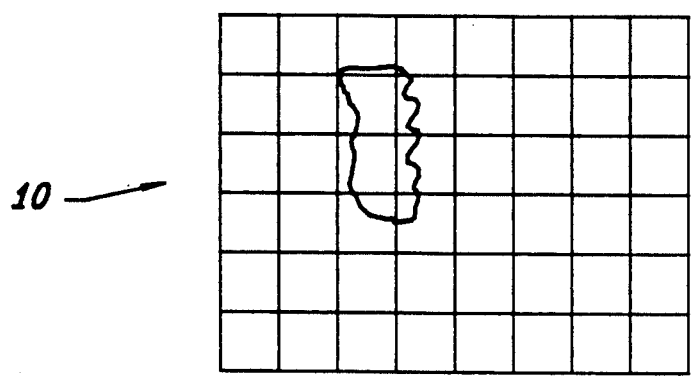
FIG. 1 is a schematic, graphical illustration of an image in a field of view segmented into a plurality of pixels.

Referring to FIG. 1, there is shown a schematic, graphical illustration of an image 10. The image 10 is shown as imaging the entire field of view. However, clearly the image can be only a portion of a field of view (as in spot focussing). The image 10 is segmented into a plurality of pixels. As shown in FIG. 1, the image 10 is segmented into eight pixels by six pixels for a total of 48 pixels. Clearly, the number of pixels can be greater than this number. Each pixel has a light intensity value that has a gray scale of eight bits for a total of 256 possible light intensity values. The number of gray scale values can also be any value. The image 10, shown in FIG. 1, is made by a lens 12 focussing on an imaging plane 14 in a first focal position (see FIG. 4).

Figure 2:
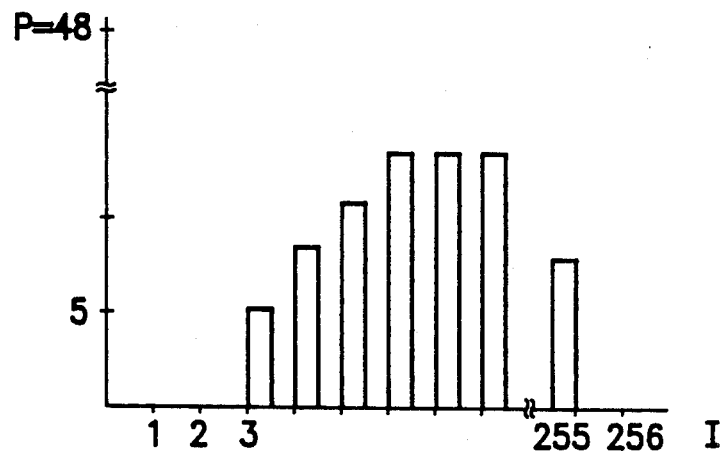
FIG. 2 is a graph showing a histogram of intensity of light versus the number of pixels in the image, shown in FIG. 1.

The gray scale value or the intensity value at each pixel is then determined, and a histogram of the pixels and the intensity value is formed. This is shown in FIG. 2. The number of pixels having a particular intensity value is plotted against the intensity value. Thus, as shown in FIG. 2, there are no pixels in image 10 that have intensity values of one or two.

From the histogram shown in FIG. 2, a cumulative histogram is then developed. The cumulative histogram is formed by summing the number of pixels that has at least a certain intensity value. If $N = f(I)$, where N is the number of pixels having an intensity level I, then Cum $N = F(I)$ where Cum N is the cumulative number of pixels having an intensity level I, and where $$F(I) = \sum_{j=0}^{I} f(j)$$

From the cumulative histogram, the position that represents the best focal position can be determined. This can be accomplished by a number of possible ways.

Figure 3:
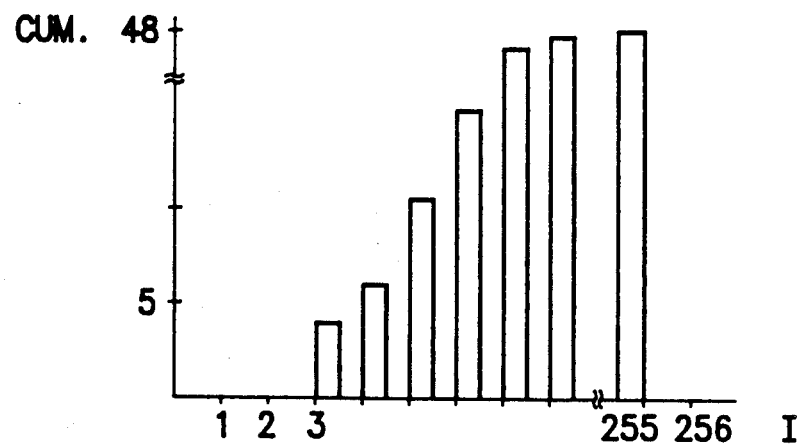
FIG. 3 is a graph showing a cumulative histogram of intensity of light versus the cumulative number pixels in the image, shown in FIG. 1.

If the image is of bright field illumination, i.e. the object is dark compared to a bright background, the smallest cumulative number of pixels that has a non-zero intensity light value is chosen. The intensity of light that corresponds to that value is then recorded. Thus, as shown in FIG. 3, the smallest cumulative number of pixels that has a non-zero intensity of light value is 5. The light intensity that corresponds to the cumulative of number pixels 5 is the light is the light intensity value of 3.

Once this value (hereinafter: "sharpness value") is chosen, the lens 12 is then moved into another position. The steps are then repeated in that a new image 10 is formed and is segmented into a plurality of pixels. The histogram of the intensity of light from each pixel is then developed. A cumulative histogram of the image is then developed from the histogram. The sharpness value is then determined from the cumulative histogram.

The lens 12 is then yet moved again to another new position. The steps are repeated and a new sharpness value is determined. From the plurality of the positions of the lens 12, there is a corresponding sharpness value.

The position of the lens 12 is chosen, such that the lowest sharpness value is chosen. The position that corresponds to the lowest sharpness value represents the best focal position for the lens 12 from the plurality of focal positions. In the event a plurality of cumulative pixel numbers all have the same lowest intensity value, then the largest cumulative pixel number having the lowest intensity value is chosen.

The theory of the method of the present invention is as follows: By moving the lens 12 to a plurality of positions, a sharpness value for each position is developed. The sharpness value corresponds to the image having the darkest pixel. The best focal position is the one for which the darkest pixel is the darkest pixel of all the different images of all the different focal positions. Conversely, the lens 12 is not in the best focal position when the darkest pixel becomes lighter; i.e., the sharpness value is not the lowest value.

In a variation of the above-described method, a second sharpness value is chosen from the cumulative histogram at each of the positions traversed by the lens 12. The second sharpness value is determined by selecting a cumulative pixel number, other than the first non-zero cumulative pixel number. Thus, for example, the second sharpness value can be chosen where the cumulative pixel number first attains a value of 100 or more. That second sharpness value is noted for each of the positions traversed by the focussing lens 12. In the event multiple positions have the same lowest sharpness value, then the position that has the lowest second sharpness value is selected. In the event where multiple positions result in the same sharpness value, this means that the dark pixels at each of the positions have the same darkness. The choice of the smallest intensity that corresponds to the second sharpness value determines the "size-contrast" sensitivity. A large cumulative pixel number, which is not the first non-zero value, means that the sensitivity is geared towards large objects. Conversely, a small intensity cumulative pixel number relates to a small object.

In the event the image is of dark field illumination, i.e. a bright object is set against a dark background, the largest cumulative pixel number that has a non-zero intensity light value is chosen (hereinafter: "sharpness value"). Similar to the foregoing discussion for bright field illumination, a plurality of sharpness values is obtained. The position that results in the largest sharpness value is then chosen as the position that represents the object being in the best focal position. In the event a plurality of cumulative pixel numbers all have the same largest intensity value, then the largest cumulative pixel number with the largest intensity value is chosen.

Similarly, in a variation of the above-described method for dark field illumination, a second sharpness value is chosen from the cumulative histogram at each of the positions traversed by the lens 12. The second sharpness value is determined by selecting a cumulative pixel number, other than the largest non-zero cumulative pixel number. Thus, for example, the second sharpness value can be chosen where the cumulative pixel number first attains a value of (total - 100) or less. That second sharpness value is noted for each of the positions traversed by the focussing lens 12. In the event multiple positions have the same largest sharpness value, then the position that has the largest second sharpness value is selected. In the event where multiple positions result in the same sharpness value, this means that the bright pixels at each of the positions have the same brightness.

There are a number of methods for moving the lens 12 to a plurality of positions.

First, the lens 12 can be moved in discrete, even small increments (so called fine movements). From the plurality of discrete positions, the best focal position is then chosen. This technique has the advantage that virtually all possible positions would have been tested by the method of the present invention before the best focal position is selected. However, this method can be time-consuming.

Secondly, the lens 12 can be moved in discrete, even large increments (so called coarse movements). From the plurality of discrete positions, the best coarse focal position is then determined. Thereafter, the lens 12 is moved to the best coarse focal position, and is moved (plus and minus) about the coarse focal position in a plurality of fine discrete even positions. The best fine focal position is then determined. Because focussing of an image is a monotonical problem, i.e. focussing improves in one direction and degrades in the opposite direction, the best fine focal position would be the best focal position. This method has the advantage that the best coarse focal position can be quickly determined and ultimately the best focal position determined, quickly.

Lastly, the method of the present invention also contemplates plotting the plurality of sharpness values obtained from a plurality of positions (which do not have to be based upon discrete even positions), and fitting a best graph to the plurality of sharpness values thereto. From the graph plotted through the plurality of sharpness values, and using interpolation, the best focal position can be determined.

Figure 4:
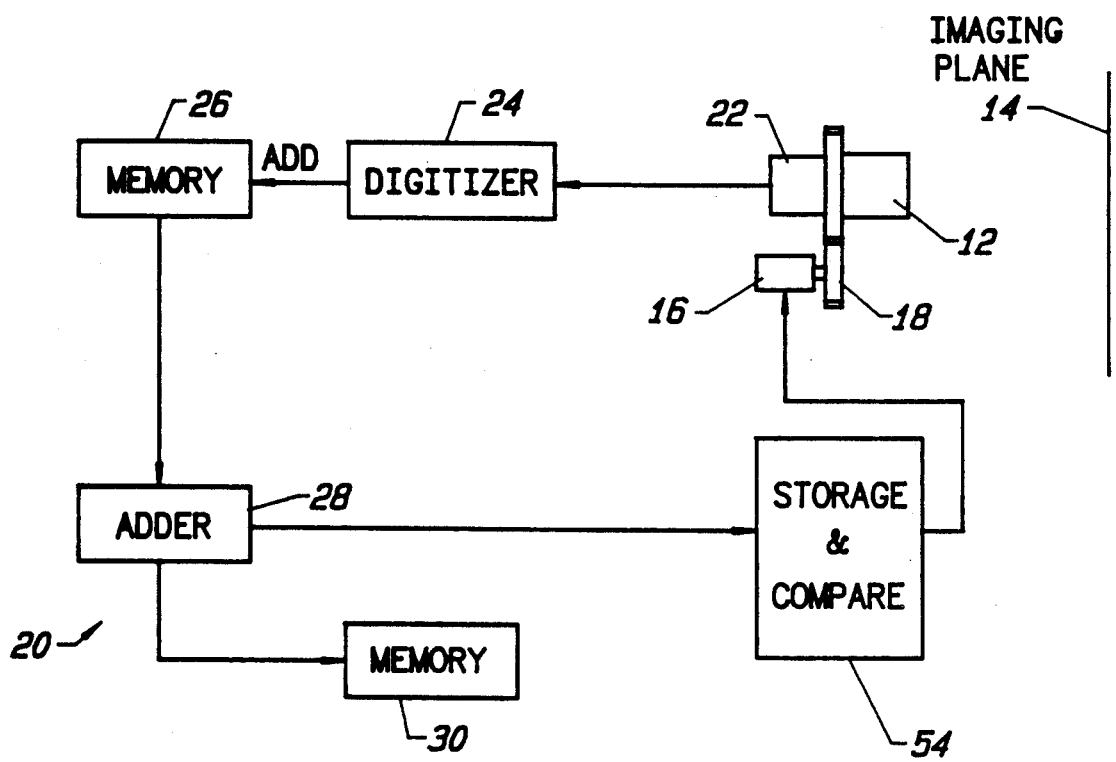
FIG. 4 is a block diagram of an apparatus suitable for carrying out the method of the present invention.
Figure 5:
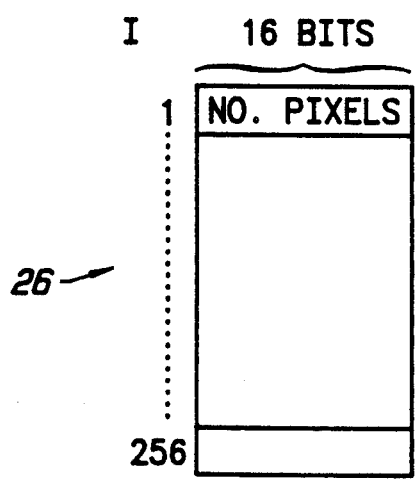
FIG. 5 is a block diagram of one memory component of the apparatus, shown in FIG. 4.

An apparatus 20, suitable for carrying out the method of the present invention, is disclosed in FIG. 4. The apparatus 20 comprises a movable lens 12 directed at an imaging plane 14. The lens 12 is moved by a motor 16, coupled through a gear arrangement 18 to move the lens 12 through a plurality of different positions. A camera 22 is attached to the lens 12, and is adapted to image the portion of the imaging plane 14 which is in the field of view of the lens 12. The camera 22 is preferably a raster-scanned type and may be a CCD camera model TCI160BD, manufactured by RCA. The camera 22 can form an electrical image of the field of view, as seen through the lens 12. The camera 22 segments the image 10 into a plurality of pixels with an electrical signal corresponding to each pixel of the image. Since the camera 22 is of a raster-scanned type, the pixels are sequentially outputted from the camera 22. The sequential series of signals representing a plurality of pixel values are then supplied to a digitizer 24 which digitizes the gray scale value (into light bits) of each pixel received from the camera 22. The output of the digitizer 24 is a sequence of intensity values of pixels. These are then supplied as an address to a memory 26.

The memory 26 can be simply a single column of 256 registers, with each register having 16 bits. Each of the registers corresponds to the intensity value. From the digitizer 24, the intensity value of a pixel is supplied as the address to the memory 26. That is, from the digitizer 24, the intensity value is used to locate the particular register in the memory 26 and, once the particular register is addressed, that register is incremented by 1 to signify that a pixel having that particular intensity value has been counted. The result is that the memory 26, as stored therein, is a histogram of the number pixels and their intensity values.

Figure 6:
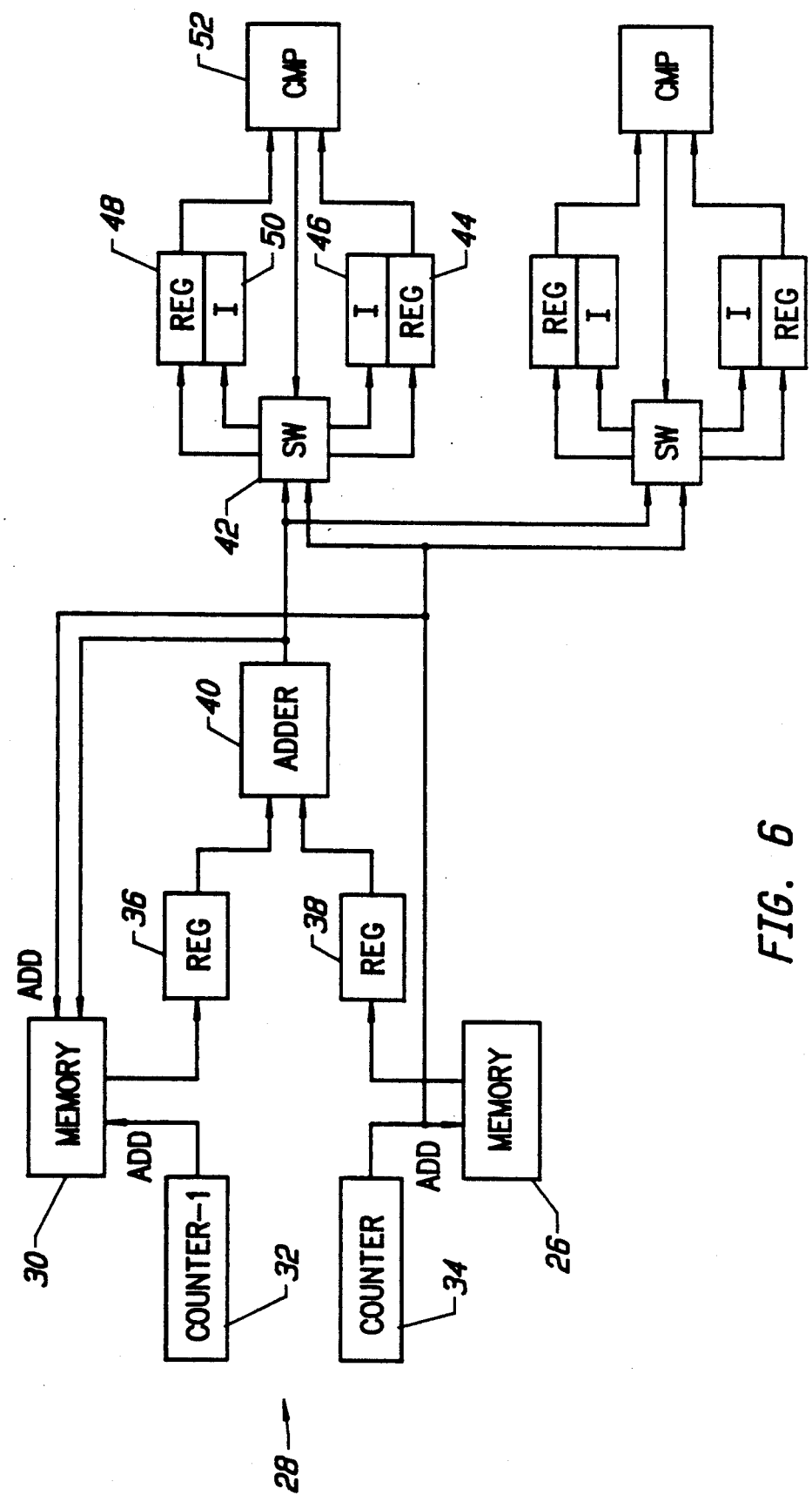
FIG. 6 is a detailed block diagram of the adder portion of the apparatus, shown in FIG. 4.

The adder 28 is shown in greater detail in FIG. 6. The function of the adder 28 is to receive the histogram values from the memory 26 and produce a cumulative histogram value therefrom and store it in memory 30. Memory 30, similar to memory 26, comprises a plurality of registers with as many registers as there are of intensity values with each register containing the value of the number of cumulative pixels having that corresponding intensity value. The cumulative histogram is formed by summing the present histogram value with the cumulative histogram of the immediate past intensity value. Thus, two counters 32 and 34 are provided. First counter 32 is one count behind the present counter which is the present intensity value and is used as the address to the memory 30. The register value corresponding to the address from the first counter 32 is stored in register 36. This is the cumulative histogram of the intensity value immediately prior to the current intensity value.

The second counter 34 contains the count of the present intensity value. That is used as an address to the memory 26. The data therefrom is supplied to the second register 38. The adder 40 adds the two together and stores the result in memory 30, using the current counter value from the second counter 34 as the address therefor. The current counter or intensity value and the current cumulative pixel histogram value is also supplied to a switch 42.

From the switch 42, the data is supplied either to a register 48 and intensity register 50 or a second pair of register 44 and intensity register 46. A comparator 52 compares the stored values of the current cumulative histogram and the intensity corresponding thereto with the last calculated, cumulative histogram and the intensity that corresponds thereto and the smaller of the two is saved. The switch 42 is activated, such that the next output from the adder 40 is supplied to the register and intensity register pair that stores the larger of the two values. Thus, that register will be erased.

Once the adder 28 has completed its task of forming the cumulative intensity value, the register and intensity register containing the smallest value is supplied to a storage and comparator 54. Thus, the "sharpness value" of the intensity which corresponds to the smallest pixel value having a non-zero intensity value is stored in the storage and comparator 54. The storage and comparator 54 activates the motor 16 and moves the lens 12 through the gear 18 to another focal position. The steps of calculating and determining the sharpness value is repeated, and the new sharpness value for the new focal position is stored in the storage and comparator 54. When the lens 12 has moved to its final position, the storage and comparator 54 compares all the sharpness values and determines the smallest or lowest sharpness value. This then activates the motor 16 moving the lens 12 to the position that corresponds to the position which produces the smallest sharpness value.

The output from the adder 40 and the counter 34 can be supplied to another switch and another pair of register and intensity registers to store the intensity value of light that corresponds to a cumulative pixel number other than the smallest cumulative pixel number having a non-zero intensity light value. This then can be stored in a second storage and comparator and used in the event the sharpness values from the storage and comparator 54 does not produce a single position having the smallest sharpness value.

As can be appreciated by those having ordinary skill in the art, the memory 26, adder 28, memory 30 and storage and comparator 54 can all be part of a microcomputer with appropriate software.

What is claimed is:

1. A method of selecting the best focal position from a plurality of focal positions for a focussing means focussing an image in a field of view, or a portion thereof; said method comprising the steps of:
    a. moving said focussing means to a first position;
    b. forming said image;
    c. segmenting said image to form a plurality of pixels;
    d. forming a histogram of the intensity of light of each pixel in said image;
    e. forming a cumulative histogram of said histogram formed from step (d);
    f. recording the intensity of light that corresponds to a particular pixel number having a non-zero intensity of light value from said cumulative histogram;
    g. moving said focussing means to a new position and repeating the steps of (b)–(f) for a plurality of focal positions; and
    h. determining the position that represents the best focal position from the plurality of focal positions from step (g).

2. The method of claim 1, wherein said image is of a bright field illumination.

3. The method of claim 2, wherein said pixel number is the smallest pixel number.

4. The method of claim 3, wherein said determining step (h) is choosing the position from step (g) that results in the lowest intensity of light value from step (f).

5. The method of claim 3, wherein said determining step (h) is choosing the position from step (g) that corresponds to the largest cumulative pixel number with the lowest intensity of light value from step (f), in the event a plurality of cumulative pixel numbers all have the same lowest intensity of light value.

6. The method of claim 4 further comprising the steps of:
    i. recording the intensity of light that corresponds to a cumulative pixel number, other than the smallest cumulative pixel number having a non-zero intensity of light value from said cumulative histogram;
    j. determining the intensity of light value obtained from step (i) for each new position of said focussing means; and
    k. choosing the position from step (g) that results in the lowest intensity of light value from step (i) in the event a plurality of positions result in the lowest intensity of light value from step (f).

7. The method of claim 1, wherein said image is of a dark field illumination.

8. The method of claim 7, wherein said pixel number is the largest pixel number.

9. The method of claim 8, wherein said determining step (h) is choosing the position from step (g) that results in the largest intensity of light value from step (f).

10. The method of claim 9, wherein said determining step (h) is choosing the position from step (g) that corresponds to the largest cumulative pixel number with the largest intensity of light value from step (f), in the event a plurality of cumulative pixel numbers all have the same largest intensity of light value.

11. The method of claim 9 further comprising the steps of:
    i. recording the intensity of light that corresponds to a cumulative pixel number, other than the largest cumulative pixel number having a non-zero intensity of light value from said cumulative histogram;

j. determining the intensity of light value obtained from step (i) for each new position of said focussing means; and k. choosing the position from step (g) that results in the highest intensity of light value from step (i) in the event a plurality of positions result in the highest intensity of light value from step (f).

12. The method of claim 1, wherein said moving step of step (g) further comprises:

g(1) moving in discrete, equal increments from one position to another.

13. The method of claim 12, further comprising:

i. moving said focussing means to the position determined from step (h);

j. moving said focussing means to a new position in an increment smaller than the increment of step g(1), and repeating the steps of (b)-(f) for a plurality of new focal positions, wherein each new focal position is displaced an increment smaller than the increment of step g(1); and h. determining the position that represents the best focal position from the plurality of focal positions from step (j).

14. The method of claim 1, wherein said determining step of step (h) further comprises plotting a best fit graph to the plurality of values from step (f) and interpolating the result to obtained the best position.

15. An apparatus for focussing an image in a field of view by a focussing means; said apparatus comprising the steps of:

a. means for forming said image;

b. means for segmenting said image to form a plurality of pixels;

c. means for forming a histogram of the intensity of light of each pixel in said image;

d. means for forming a cumulative histogram of said histogram formed from step (c);

e. means for recording the intensity of light that corresponds to a particular cumulative pixel number having a non-zero intensity of light value from said cumulative histogram;

f. means for moving said focussing means to a new position and repeating the steps of (a)-(e) for the image formed at the new position; and g. means for determining the position that represents the best focal position from the plurality of focal positions from step (f).

16. The apparatus of claim 15, wherein said image is of a bright field illumination.

17. The apparatus of claim 16, wherein said pixel number is the smallest pixel number.

18. The apparatus of claim 17, wherein said determining step (g) is choosing the position from step (f) that results in the lowest intensity of light value from step (e).

19. The apparatus of claim 18 further comprising the steps of:

h. recording the intensity of light that corresponds to a cumulative pixel number, other than the smallest cumulative pixel number having a non-zero intensity of light value from said cumulative histogram;

i. determining the intensity of light value obtained from step (h) for each new position of said focussing means; and j. choosing the position from step (f) that results in the lowest intensity of light value from step (h) in the event a plurality of positions result in the lowest intensity of light value from step (e).

20. The apparatus of claim 15, wherein said image is of a dark field illumination.

21. The apparatus of claim 20, wherein said pixel number is the largest pixel number.

22. The apparatus of claim 21, wherein said determining step (g) is choosing the position from step (f) that results in the largest intensity of light value from step (e).

23. The apparatus of claim 22 further comprising the steps of:

h. recording the intensity of light that corresponds to a cumulative pixel number, other than the largest cumulative pixel number having a non-zero intensity of light value from said cumulative histogram;

i. determining the intensity of light value obtained from step (h) for each new position of said focussing means; and j. choosing the position from step (f) that results in the highest intensity of light value from step (h) in the event a plurality of positions result in the highest intensity of light value from step (e).

* * * * *